United States Patent [19]
Feuillade et al.

[11] 3,849,199
[45] Nov. 19, 1974

[54] ELECTROCHEMICAL GENERATOR WITH A ZINC ELECTRODE

[75] Inventors: Georges Feuillade, Arpajon; Paul Cord, Paris, both of France

[73] Assignee: Compagnie Generale D'Electricite, Paris, France

[22] Filed: Feb. 16, 1973

[21] Appl. No.: 333,420

[30] Foreign Application Priority Data
Feb. 24, 1972 France .............................. 72.06294
Feb. 25, 1972 France .............................. 72.06491

[52] U.S. Cl. ................................. 136/30, 136/155
[51] Int. Cl. ......................................... H01m 43/02
[58] Field of Search... 136/30, 31, 154, 155, 125–130

[56] References Cited
UNITED STATES PATENTS

| | | | |
|---|---|---|---|
| 916,575 | 3/1909 | Morrison | 136/31 |
| 2,919,216 | 12/1959 | Corren | 136/155 |
| 2,952,572 | 9/1960 | Johnson | 136/154 |
| 2,992,143 | 7/1961 | Clifford et al. | 136/155 X |
| 3,060,254 | 10/1962 | Urry | 136/30 X |
| 3,516,862 | 6/1970 | Van der Grinter | 136/30 |
| 3,540,935 | 11/1970 | Keating et al. | 136/30 X |
| 3,671,319 | 6/1972 | Arrance | 136/30 |

Primary Examiner—Winston A. Douglas
Assistant Examiner—C. F. Lefevour
Attorney, Agent, or Firm—Sughrue, Rothwell, Mion, Zinn & Macpeak

[57] ABSTRACT

Electrochemical generator with a zinc electrode comprising a positive electrode, a collector core constituted by a metal grid covered by a material containing zinc, an electrolyte comprising a base aqueous solution of an alkaline polyacid salt and more particularly a phosphate in a concentration such that the pH be maintained at a substantially constant value, the said material being thermo-hardening and having a composition, by weight, of 10 to 100 parts of the said polyacid alkaline salt, 50 to 200 parts of a compound containing zinc, and 2 to 20 parts of at least one oxide of a metal chosen among the elements of columns IIA and IIB of the periodic classification as well as lithium, the said electrolyte comprising, moreover, at least one alkaline halide.

20 Claims, No Drawings

ELECTROCHEMICAL GENERATOR WITH A ZINC ELECTRODE

BACKGROUND OF THE INVENTION

1. Field of the Invention

The present invention has for its object an electrochemical storage cell having a zinc electrode.

2. Description of the Prior Art

It is known that in electrochemical storage cells of the type comprising a negative electrode basically containing zinc and a positive electrode basically containing either nickel or silver or others, it is necessary for the solubility of the zinc in the electrolyte to have a certain value to obtain correct operation of the storage cell as a whole. Indeed, if the solubility of the zinc is less than a certain value, the products resulting from the electrochemical process remain in the immediate neighbourhood of the electrode and passivate it.

Such solubility depends on the electrolytic liquid and, to give a clear idea, is in the order of $5 \times 10^{-2}$ moles per litre, for an electrolyte consisting of pH 13.5 potassium phosphate.

That solubility is generally obtained adjusting the pH of the electrolyte by means of "buffer" solutions having a predetermined concentration. Such "buffer" solutions generally consist of salts of certain weak acids, such as borates and others.

In such storage cells, the zinc electrode is basically produced for example from a conductive core constituted by a grid made of a metal which is chemically inert with respect to the electrolyte, such as silver, the said grid being covered with a zinc sheet.

In the particular case of storage cells in which the electrolyte is highly alkaline, it is observed that such electrodes have, more particularly at the end of a certain number of charging and discharging cycles, appreciable deformations and modifications in structure, on the one hand, aS well as a certain corrosion of their active part, on the other hand.

The result of this is an appreciable decrease in the performances of the generator as a whole, inasmuch as concerns, more particularly, the capacity as well as the maximum intensity of the current discharged.

The present invention makes it possible to overcome the above disadvantages and it has for its object an electrochemical storage cell, more particularly of the rechargeable type in which the electrolyte is, to great advantage, constituted by a "buffer" medium and in which the electrode has a structure which is unchangeable even at the end of a great number of charging and discharging cycles, that storage cell enabling high rated capacities to be produced while being easy to manufacture at a moderate cost price.

SUMMARY OF THE INVENTION

The invention therefore has as its object an electrochemical storage cell of the type comprising a positive electrode, a negative electrode comprising a collector core consisting of a chemically inert metallic grid covered with a substance containing zinc, an electrolyte consisting of an aqueous base solution of an alkaline polyacid salt and more particularly of phosphate in a concentration such that the pH be maintained at a substantially constant and predetermined value or range of values, characterised in that the said substance is a heat hardening substance having a composition by weight of 10 to 100 parts of the said alkaline polyacid salt, 50 to 200 parts of a compound containing zinc, and 2 to 20 parts of at least an oxide or a metal chosen from among the elements in column IIA and IIIB of the periodical classification, as well as lithium, and in that the said electrolyte comprises, moreover, at least one alkaline halide.

DETAILED DESCRIPTION OF THE INVENTION

Other characteristics and advantages of the invention will become apparent from the following description of a few examples of embodiment of an electrochemical storage cell according to the invention, these examples being given purely by way of illustration but having no limiting character.

First example:

The electrolyte consists of monoacid sodium phosphate in a concentration equal to 4 moles per litre, the pH being 13.5. The electrolyte being solid, the storage cell as a whole constitutes, to great advantage, a dry cell.

The electrode is constituted by a silver grid for example covered by a substance containing zinc.

That substance has, for example, the following composition by weight:

| | |
|---|---|
| Monoacid sodium phosphate | 100 parts |
| Zinc oxide | 50 parts |
| Calcium oxide | 10 parts |

Second example:

The electrolyte is constituted by monoacid potassium phosphate in a concentration equal to 4 moles per litre, the pH being 13.5. On using a nickel positive electrode, a capacity of 250 mAH per gram of electrode, which is a generator of 75 WH per kilogram is obtained, the difference in potential being in the order of 1.6 volt, both the electrical and the structural characteristics remaining practically invariable even at the end of about several hundreds of consecutive charging and discharging cycles.

The composition of the substance forming the electrode in that case is, for example:

| | |
|---|---|
| Monoacid potassium phosphate | 100 parts |
| Zinc oxide | 150 parts |
| Lithium oxide | 5 parts |
| Magnesium oxide | 5 parts |

Third example:

The electrolyte consists of monoacid potassium phosphate in a concentration equal to 6 moles per litre and potassium chloride in a concentration of 2 moles per litre, the pH being about 7.5.

In this case, performances comparable to those shown above are obtained, the composition of the substance constituting the electrode being, for example:

| | |
|---|---|
| Monoacid potassium phosphate | 15 parts |
| Powdered zinc and graphite | 90 parts |
| Lithium oxide | 5 parts |
| Calcium oxide | 10 parts |

Fourth example:

The electrolyte consists of monoacid ammonium phosphate in a concentration equal to 6 moles per litre, the pH being in the order of 13. Performances equal to those mentioned above have also been obtained, the composition of the substance constituting the electrode being, for example:

| Monoacid ammonium phosphate | 20 parts |
|---|---|
| Zinc | 85 parts |
| Aluminum oxide | 5 parts |
| Magnesium oxide | 10 parts |

Fifth example:

The electrolyte consists of diacid ammonium phosphate in a concentration equal to 4 moles per litre, and of ammonium fluoride in a concentration in the order of 3 moles per litre, the pH being in the order of 7.5. A negligible corrosion of the electrodes will be observed, even at the end of a very long operation time, the composition of the substance constituting the zinc electrode being substantially the same as above.

Inasmuch as concerns the manufacturing of the electrode itself, the elements of the substance are diluted in about 100 parts of water and the paste obtained is applied on a silver grid, either by manual pasting or by painting, this last method enabling slight thicknesses to be obtained. The water is then removed by suitably drying, and such a mixture of elements then forms a layer on the grid by hardening under the action of heat.

It must be understood that the invention is in no way limited to the embodiments which have just been described, but covers, moreover, all variants.

We claim:

1. An electrochemical storage cell comprising a positive electrode, a negative electrode comprising a collector core consisting of a chemically inert metallic grid covered with a substance containing zinc, an electrolyte consisting of an aqueous basic solution of an alkaline polyacid phosphate salt in a concentration such that the pH be maintained substantially constant and at a predetermined value or range of values, wherein said substance containing zinc is a heat hardening substance having a composition by weight of 10 to 100 parts of said alkaline polyacid phosphate salt, 50 to 200 parts of zinc or a compound containing zinc, and 2 to 20 parts of at least an oxide of a metal selected from the group consisting of the elements in columns IIA and IIIB of the periodical classification and lithium, and wherein said electrolyte includes at least one alkaline halide.

2. Storage cell according to claim 1, wherein said alkaline polyacid salt is a monoacid phosphate.

3. Storage cell according to claim 1, wherein said alkaline polyacid salt is a phosphate diacid.

4. Storage cell according to claim 1 wherein the concentration of said alkaline polyacid ranges between 3 and 10 moles per litre.

5. Storage cell according to claim 1 wherein said alkaline polyacid is sodium phosphate, the pH being between 13 and 14.

6. Storage cell according to claim 1 wherein said alkaline polyacid is potassium phosphate, the pH being between 7 and 14.

7. Storage cell according to claim 1 wherein said alkaline polyaicd is ammonium phosphate, the pH being between 7 and 14.

8. Storage cell according to claim 1 wherein said oxide is calcium oxide.

9. Storage cell according to claim 1 wherein said oxide is magnesium oxide.

10. Storage cell according to claim 1 wherein said oxide is aluminum oxide.

11. Storage cell according to claim 1 wherein said oxide is gallium oxide.

12. Storage cell according to claim 1 wherein said oxide is lithium oxide.

13. Storage cell according to claim 1 wherein said compound containing zinc is metallic zinc.

14. Storage cell according to claim 1 wherein said compound containing zinc is a mixture of metallic zinc with powdered carbon.

15. Storage cell according to claim 1 wherein said halide is a fluoride.

16. Storage cell according to claim 1 wherein said halide is a chloride.

17. Storage cell according to claim 15 wherein the concentration of said halide up to 6 moles per litre.

18. Storage cell according to claim 16 wherein the concentration of said halide is up to 6 moles per litre.

19. Storage cell according to claim 1, wherein said substance containing zinc is non-sintered.

20. Storage cell according to claim 1, wherein the concentration of said halide is 2 to 6 moles per liter.

* * * * *